United States Patent [19]

Arai et al.

[11] Patent Number: 5,329,327
[45] Date of Patent: Jul. 12, 1994

[54] BUILT-IN FLASH SYSTEM

[75] Inventors: Akihiro Arai; Tetsuji Shono, both of Tokyo, Japan

[73] Assignee: Asahi Kogaku Kogyo Kabushiki Kaisha, Tokyo, Japan

[21] Appl. No.: 700,033

[22] Filed: May 7, 1991

Related U.S. Application Data

[60] Continuation of Ser. No. 626,230, Dec. 11, 1990, abandoned, which is a continuation of Ser. No. 490,001, Mar. 7, 1990, abandoned, which is a division of Ser. No. 306,436, Feb. 3, 1989, Pat. No. 4,920,368, which is a continuation of Ser. No. 143,488, Jan. 13, 1988, abandoned.

[30] Foreign Application Priority Data

| Jan. 13, 1987 | [JP] | Japan | 62-5815 |
| Jan. 13, 1987 | [JP] | Japan | 62-5816 |
| Jan. 13, 1987 | [JP] | Japan | 62-5817 |
| Feb. 6, 1987 | [JP] | Japan | 62-16209 |
| Feb. 9, 1987 | [JP] | Japan | 62-27898 |
| Feb. 9, 1987 | [JP] | Japan | 62-27899 |

[51] Int. Cl.⁵ .............................................. G03B 15/05
[52] U.S. Cl. .............................................. 354/149.11
[58] Field of Search .................. 354/403, 419, 149.11, 354/415

[56] References Cited

U.S. PATENT DOCUMENTS

| 1,866,581 | 7/1932 | Simjian | 354/403 |
| 2,784,696 | 3/1957 | Sewing | 354/126 |
| 3,488,586 | 1/1970 | Bretthauer | 240/1.3 |
| 4,067,030 | 1/1978 | Kuramoto et al. | 354/139 |
| 4,150,888 | 4/1979 | Filipovich | 354/403 |
| 4,341,449 | 7/1982 | Iwata et al. | 354/126 |
| 4,515,450 | 5/1985 | Arrazola | 353/5 |
| 4,515,453 | 5/1985 | Wakabayashi | 354/149 |
| 4,571,047 | 2/1986 | Hirai | 354/403 |
| 4,609,269 | 9/1986 | Kamata | 354/149.11 |
| 4,690,538 | 9/1987 | Matsui et al. | 354/403 |
| 4,734,733 | 3/1988 | Clapp et al. | 354/149.11 X |
| 4,755,838 | 7/1988 | Lemmey | 354/126 X |
| 4,771,308 | 9/1988 | Tejima et al. | 354/403 |
| 4,801,963 | 1/1989 | Koyama et al. | 354/403 |
| 4,804,991 | 2/1989 | Ishizuki et al. | 354/403 |
| 4,893,140 | 1/1990 | Yamamoto et al. | 354/149.11 |
| 4,910,542 | 3/1990 | Yamamoto et al. | 354/149.11 |

FOREIGN PATENT DOCUMENTS

| 2848809 | 11/1978 | Fed. Rep. of Germany . |
| 2940301 | 10/1979 | Fed. Rep. of Germany . |
| 8336141 | 3/1984 | Fed. Rep. of Germany . |
| 58-208735 | 12/1983 | Japan . |
| 60-21732 | 2/1985 | Japan . |
| 2106261 | 4/1983 | United Kingdom . |
| 2125568 | 3/1984 | United Kingdom . |

Primary Examiner—William B. Perkey
Attorney, Agent, or Firm—Sughrue, Mion, Zinn, Macpeak & Seas

[57] ABSTRACT

A built-in flash system is disclosed which includes a housing chamber provided in the upper front of a pentahouse of a finder optical system, and a casing provided in the housing chamber and having a flashlight emitter arranged so as to be movable between a projecting position where the casing is projected for light emission and a housing position where the casing is housed in said housing chamber, the casing is arranged to be moved between the projecting position and the housing position by a linkage mechanisms disposed at sides of said built-in flash system.

6 Claims, 10 Drawing Sheets

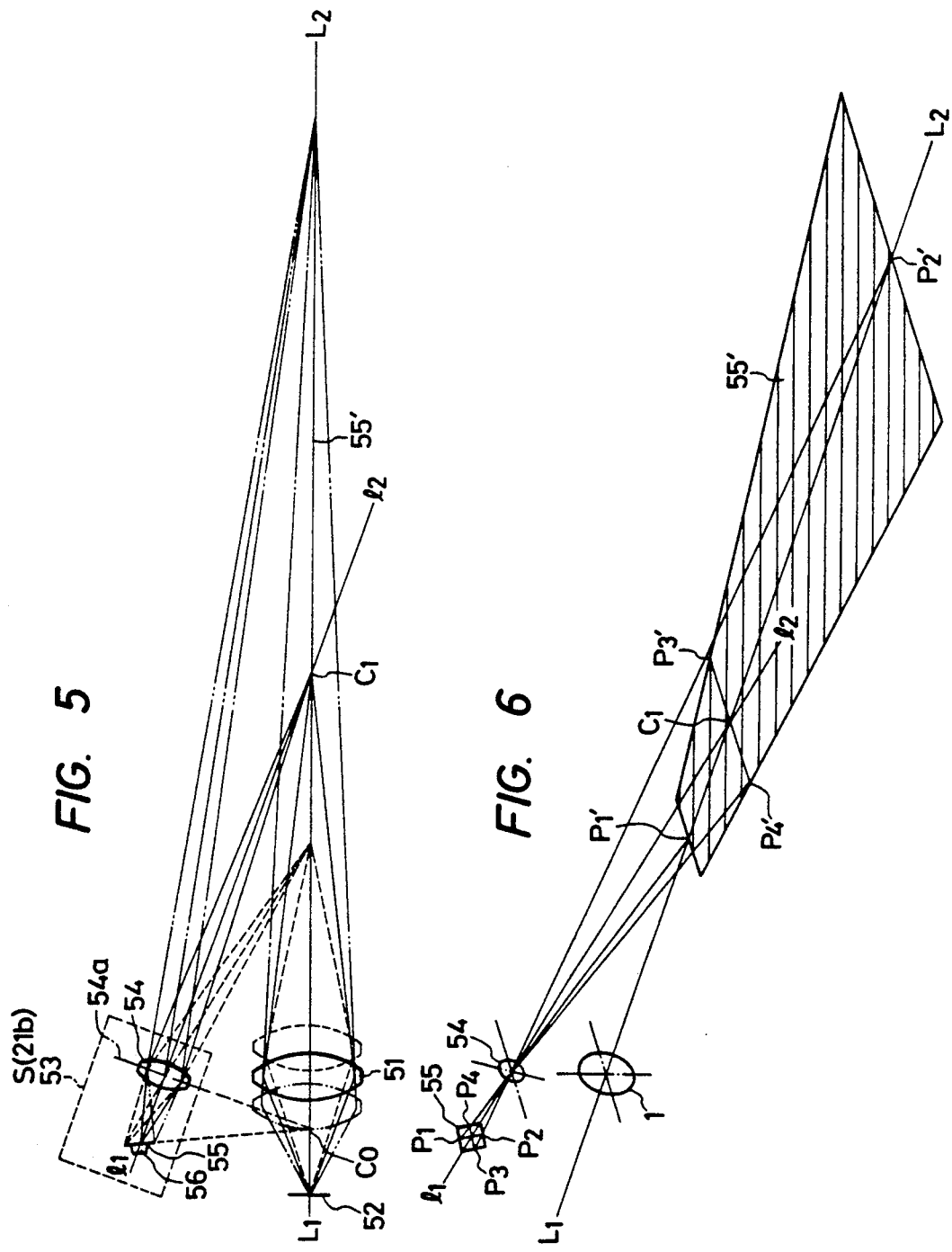

— BUILT-IN FLASH SYSTEM

This is a continuation of pending prior parent application Ser. No. 07/626,230 filed on Dec. 11, 1990, abandoned, which is a continuation of application Ser. No. 07/490,001filed Mar. 7, 1990, abandoned, which is a Divisional of application Ser. No. 07/306,436, filed Feb. 3, 1989, now U.S. Pat. No. 4,920,368, which is a continuation of 07/143,488, filed Jan. 13, 1988, abandoned.

BACKGROUND OF THE INVENTION

The present invention relates to a camera having a built-in flash.

Recently, with the progress of automatic mechanization in the field of single-lens reflex cameras, various cameras including an autofocusing device and a built-in flash have been proposed. An example of such an autofocusing device is described in U.S. Pat. No. 4,801,963 to Koyama et al, wherein the focus condition of the camera lens is determined based on the contrast of an image transmitted through the lens of the positional relationship (often referred to as a phase difference) between images or image portions transmitted through the lens. If the lighting conditions or object contrast are low, there may be insufficient light or insufficient contrast for the image sensors to operate effectively. Accordingly, Koyama et al provides an auxiliary light projector for radiating a contrast pattern (stripe pattern) toward the object during conditions of low light or low contrast. However, Koyama et al provides the auxiliary light projector separately, and their remains a problem as to how to secure a space for the auxiliary spotlight projector in the single-lens reflex camera having a limited in space.

Also, a single-lens reflex camera has an object within a range of from a close-up distance to an infinite distance as its aim. An optimum focal-length lens is selected corresponding to the kind of the subject and the distance from the subject. The cylinder length of the interchangeable lens is enlarged corresponding to the focal length thereof. Recently, with the advance of zoom lenses, photographers ordinarily using such zoom lenses to cover from wide-angle lenses to telephoto lenses, instead of conventional fixed-focal-length interchangeable lenses, have increased in number. Generally, the minimum cylinder length of the zoom lens is at the maximum focal length. Accordingly, if the zoom lens is shifted to the minimum focal length, the cylinder length is not so shortened.

Therefore, in the case where a built-in flash mechanism is incorporated in a single-lens reflex camera, it becomes important to design the camera to prevent flashlight from being blocked by the lens cylinder.

Also, in a conventional built-in flash, the flash is held in the housing position by a lock mechanism for causing a pin provided the flash or on the linkage mechanism to engage with a hook provided on the camera body. However, the lock mechanism has a disadvantage as follows. When pressure is applied to the light emission portion to move down to the housing position and then released after the pin has engaged with the hook, the light emission #portion slightly moves in the direction reverse to the pressure or in other words slightly returns toward the projecting position because a clearance always arises between the pin and the hook. For this reason, a slight space arises between the opening line portion of the housing chamber and the ceiling plate.

Such a space gives the user an unfavorable impression of the outside appearance and handling properties of the camera as a precision machine.

Also, three are two types of built-in flashes in cameras, that is, of the stationary type and of the housing type. The conventional housing type built-in flash is arranged such that a flash unit urged by a spring means in the direction of projection is normally kept at a housing position by a stoppage/engagement means so that the flash unit can be moved to a projecting position by removing the stoppage/engagement in use. Therefore, a shock due to projection was unavoidable and, further, good operational feeling could not be attained. In addition, there is no denying the fact that the shock has a bad influence upon the camera which is a precision instrument. In addition, according to the conventional housing type built-in flash, the light emission surface of the flash unit could not be moved to the bouncing position where the light emission surface looked more upward than the direction toward the subject. If bounce-photographing was necessary, it was necessary to use another outside flash.

SUMMARY OF THE INVENTION

In view of the above problems, an object of the invention is to provide a camera in which a large space is not necessary for providing the auxiliary spotlight projector.

On the basis of the fact that the auxiliary spotlight projector is used in the case of low illuminance or low contrast and that the built-in flash is used mainly in the case of low illuminance, the present invention is particularly characterized in that the auxiliary spotlight projector is provided adjacent to the flash of the built-in flash device held by the pop-up mechanism selectively in the housing position and in the projecting position.

In the case where the auxiliary spotlight projector provided adjacent to the flash is held by the pop-up mechanism selectively in the housing position and in the projecting position together with the flash, not only is it easy to secure a space for housing the auxiliary spotlight projector but also it is easy to handle because the auxiliary spotlight projector and the flash can be used at the same time. In addition, the camera can have an aesthetic or smart appearance, because the auxiliary spotlight projector and the flash can be held in the housing position when unused.

Another object of the invention is to provide a built-in flash which is simple in construction, sure in operation and easy in locating the flash itself in a higher and more advanced light emission position.

On the basis of a conclusion that a turn mechanism by four-point linkage is suited for-the mechanism for popping up this type built-in flash, the present invention has been completed. That is, the built-in flash pop-up mechanism according to the present invention is characterized in that the casing is arranged to be moved between the projecting position and the housing position by a pair of four-point linkage mechanisms disposed at the left and right sides of the built-in flash, each of the four-point linkage mechanisms being constituted by two pairs of front and rear turning levers, each pair of the front and rear turning levers being pivoted at their respective one ends to a corresponding one of opposite sides of the housing chamber and pivoted at their other ends to front and rear portions on a corresponding one of opposite sides of the casing. This mechanism is very simple in construction and therefore is advantageous in that the number of parts is small, the workability in assembling is good, the operation is sure, etc. In addition, the request that the flash must be located in a higher and more advanced projecting position can be attained easily.

Still another object of the invention is to provide a lock mechanism for locking a pop-up device, so that the housing chamber is tightly covered with the ceiling plate of the flash when the flash is in the housing position to thereby prevent any space from arising between the ceiling plate and the opening of the housing chamber or to prevent the ceiling plate from floating up from the housing chamber.

To attain the foregoing object, the present invention is directed to a built-in flash of the type having a turning lever which moves as a flash moves between a projecting position and a housing position, characterized in that a lock lever having a top stoppage/engagement surface arranged to engage/disengage with/from a stoppage surface of the turning lever moved to the flash-housing position is pivoted to the housing chamber, in that a top stoppage/engagement surface of the lock lever is formed as a wedge surface having a wedge function when the turning lever is moved toward the flash-housing position, and in that the lock lever is arranged to be operated to move in the axial direction of a shaft of the turning lever so as to make the top stoppage/engagement surface of the lock lever to engage/disengage with/from the stoppage/engagement surface of the turning lever.

Still another object of the invention is to provide a built-in flash mechanism in which the flash unit is arranged to be movable between the projecting position and the housing position without generating any shock to thereby attain an operational feeling of high rank, and in which the flash unit is made movable further to the bouncing position where the light emission surface of the flash unit looks more upward than the direction toward the subject.

The present invention has been perfected based on the thought that the flash unit which has had conventionally to be moved to the projecting position by spring means is continuously driven by an electric motor. In other words, according to the present invention, in a built-in flash, there is provided a flash unit disposed at an upper portion of the camera and arranged to be movable between a normal light emission position where a light emission surface looks forward a subject and a housing position where the light emission surface looks more downward than the direction toward the subject, the flash unit being moved by an electric motor between the normal light emission position and the housing position. Preferably, the flash unit can be made movable further to a bouncing position where the light emission surface looks more upward than the direction toward the subject, so that if the flash unit is moved by the electric motor among the bouncing position, the normal light emission position, and the housing position to thereby make it possible to perform bounce-photographing.

An object of the present invention is to provide a built-in flash apparatus of the housing type and having an adjustable radiation angle, in order to solve the problem in the conventional built-in flash.

Another object of the present invention is to provide a built-in flash apparatus in which a flash unit is arranged to be movable between a projecting position and a housing position without generating any shock to thereby attain a desirable operational feeling.

According to the present invention, in a built-in flash apparatus in a camera, there are provided a flash unit disposed at an upper portion of the camera and arranged to be movable between a normal light emission position where a light emission surface is exposed and a housing position where the light emission surface is not exposed, and a converging lens body provided in front of the light emission surface of the flash unit and arranged so as to be movable together with the flash unit between the normal light emission position and the housing position, the distance between the converging lens body and the flash unit in the normal light emission position being made variable. Preferably, the flash unit and the converging lens body are moved by an electric motor, so that no shock is generated in movement of the flash unit and the converging lens body between the normal light emission position and the housing position and a desirable operational feeling can be obtained.

BRIEF DESCRIPTION OF THE DRAWINGS

In the accompanying drawings:

FIGS. 5 and 6 illustrate an auxiliary spotlight projector optical system suitable for the camera according to the invention;

DETAILED DESCRIPTION OF THE PREFERRED EMBODIMENTS

The present invention will hereunder be described with reference to the drawings.

Figure 1:
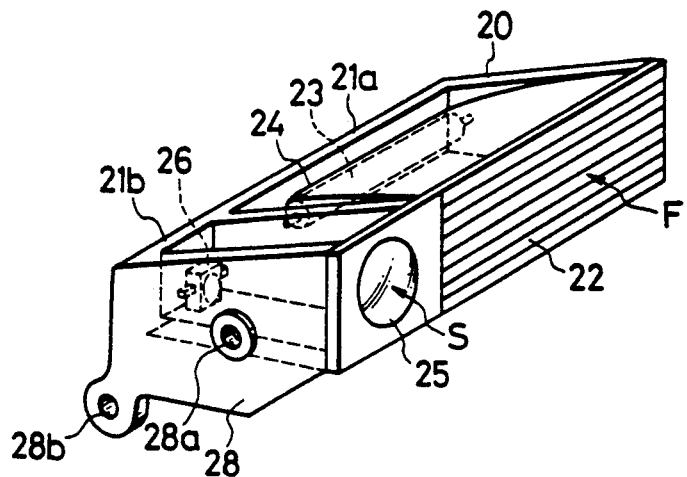
FIG. 1 is a partly perspective view showing a lighting portion of a built-in flash as a first embodiment according to the present invention.
Figure 2:
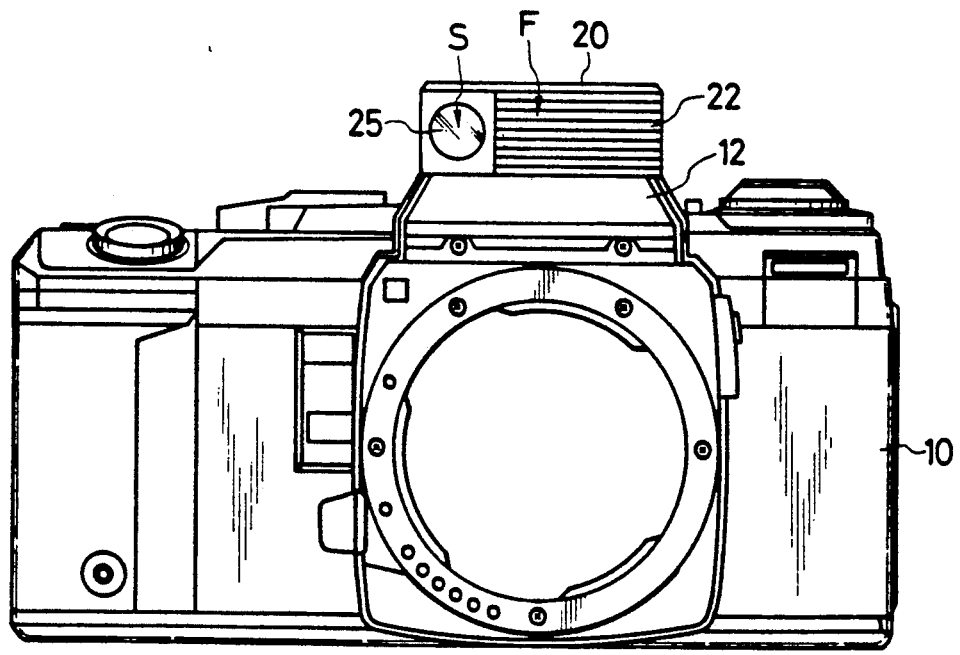
FIG. 2 is a front view showing the built-in flash united into a single-lens reflex camera body having an autofocusing device.
Figure 3:
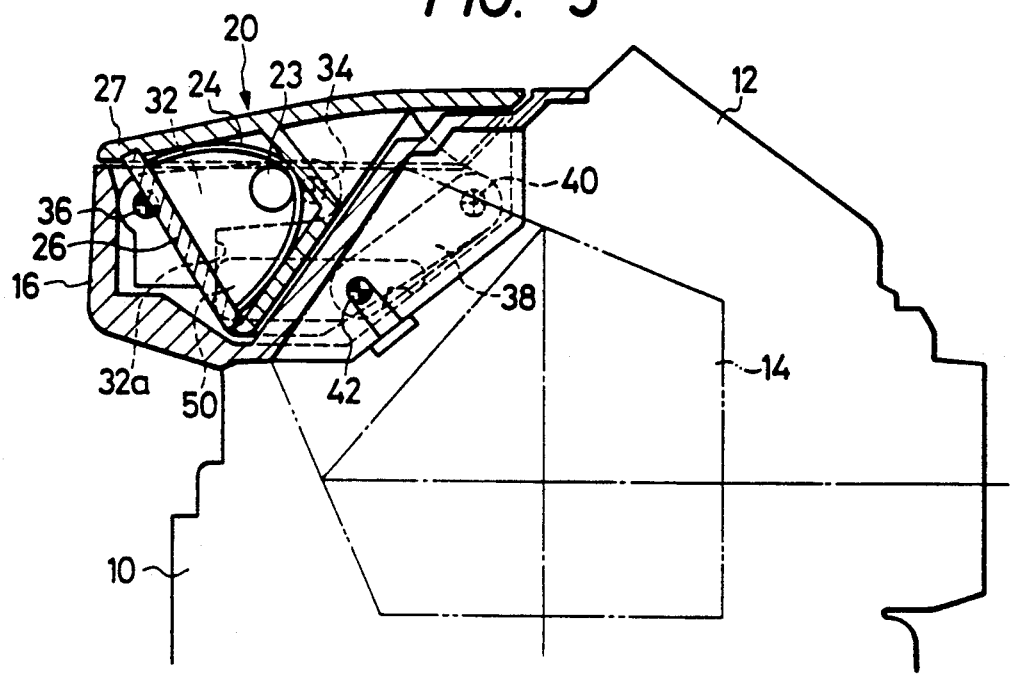
FIG. 3 is a partly vertical section taken along the optical axis, of the camera body showing the condition in which the built-in flash is housed.
Figure 4:
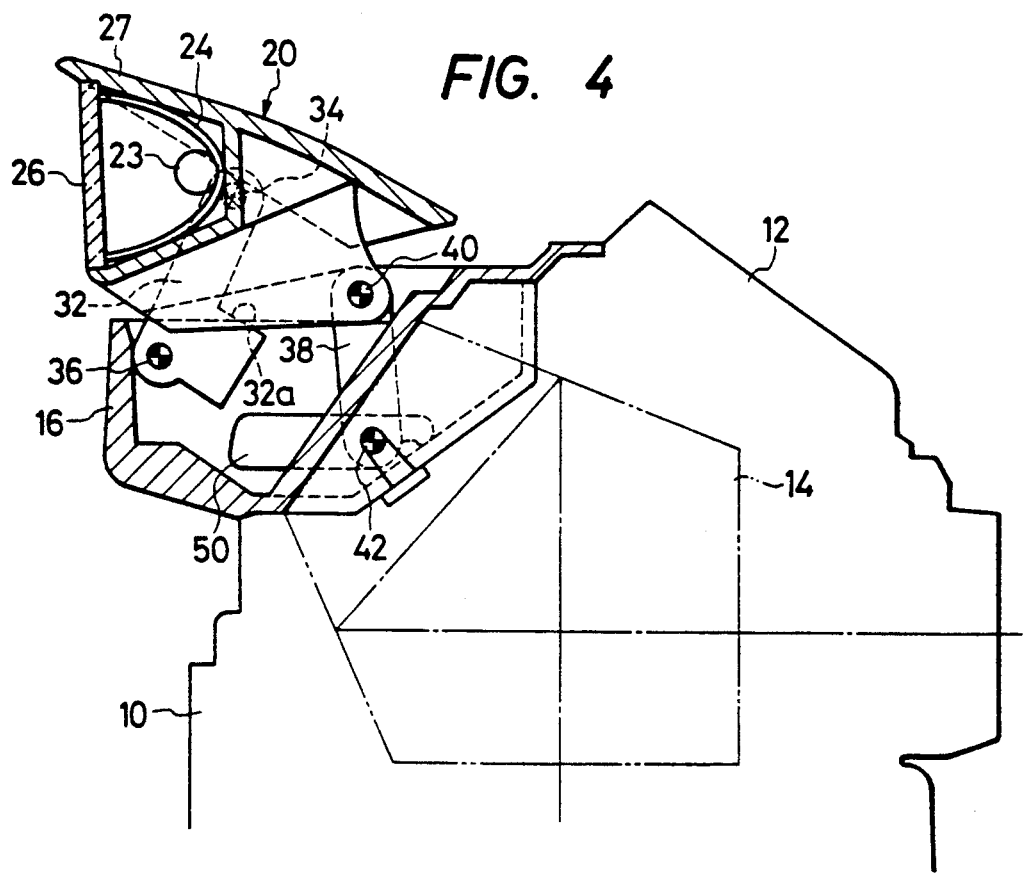
FIG. 4 is a partly vertical section showing the condition in which the built-in flash is projected.

FIG. 1 is a partly perspective view showing a lighting portion of a built-in flash as a first embodiment according to the present invention; FIG. 2 is a front view showing the built-in flash incorporated into a single-lens reflex camera body having an autofocusing device; and FIGS. 3 and 4 are partly vertical sections, of the camera body showing the pop-up mechanism of the built-in flash.

A casing 20 of the built-in flash according to the invention is partitioned into two boxes 21a and 21b, so that a flash F is provided in one box 21a, and an auxiliary spotlight projector S for measuring distance is provided in the other box 21b. A diffusion lens 22 is mounted to the front of the box 21a, and a xenon tube (light emission device) 23 and a reflection mirror 24 are attached to the rear of the box 21a. A converging lens 25 formed together with the diffusion lens is mounted to the front of the box 21b, and a spotlight projector 26 for radiating a stripe pattern to measure distance is attached to the rear of the box 21b.

The casing 20 is attached to a housing chamber 16 provided in a penta-house 12 of a camera body 10 through a pop-up mechanism so that the casing 20 is movable between the projecting position and the housing position. The structure will be described in detail with reference to FIGS. 3 and 4.

The housing chamber 16 for housing the casing 20 is provided to the upper front of a penta-prism 14 which is housed in the penta-house 12. The casing 20 has a ceiling plate 27 which forms a closed appearance together with the penta-house 12 when the casing 20 is put in the housing chamber 16.

A pop-up linkage means is provided between side plates 28 and walls of the housing chamber 16, the side plates 28 being disposed at the left and right of the casing 20. The structure in the left side is the same as that in the right side. Hereinafter, the invention will be described about one side. Shafts 34 and 40 are respectively inserted into holes 28a and 28b formed in the side plate 28. A first lever 32 and a second lever 38 are rotatably supported on the shafts 34 and 40, respectively. The other ends of the first and second levers 32 and 38 are respectively attached to the penta-house 12 within the housing chamber 16 through the shafts 36 and 42 to thereby form a pop-up mechanism composed of four-bar linkage for the casing 20. The shaft 36 supports the U-shaped first lever 32 at the bent portion thereof. A torsion spring not shown is attached to the shaft 42 of the second lever 38, so that the second lever 38 is urged to move counterclockwise in the drawing or in other words the casing 20 is urged to move upward and forward.

Further, a lock lever 50 is rotatably supported by the shaft 42, and one end of the torsion spring is fitted to the shaft 42 so that the lock lever 50 is urged to move clockwise normally. However, the range of movement of the lock lever 50 is limited by contact between one portion of the lock lever 50 and the inner wall of the housing chamber. When the casing 20 is put in the housing chamber 16, the top end of the lock lever 50 is engaged with a lock surface 32a of the first lever 32 to prevent the first lever from turning counterclockwise, so that the casing 20 is held in the housing position by the force of the torsion spring so as not to be moved to the projecting position.

The engagement of the lock lever 50 with the lock surface 32a is released by moving the lock lever 50 perpendicularly to the paper through an unlock member not shown, attached to a side of the penta-house 12.

According to the aforementioned built-in flash, when the casing 20 is moved to the projecting position by the operation of the unlock member, the flash F and the auxiliary spotlight projector S are both exposed at the same time as shown in FIGS. 1 and 3. In this condition, preparation for lighting in the xenon tube 23 of the built-in flash is started and, on the other hand, preparation for spotlighting in the spotlight projector is finished. If the photographer now pushes down the release button of the camera body 10, the spotlight projector 26 is energized to radiate a stripe pattern and then the distance from the subject is detected within the camera body 10 by reference to the contrast of the subject corresponding to the stripe pattern. Next, the lens is moved to the focusing position based on the distance-detection signal. If the release button is more pushed down, a series of procedures, such as moving-up of the mirror, running of the focal plane and flashing of the xenon tube 23, are perfected.

The aforementioned operating method applies to the case where the flash unit F and the auxiliary spotlight projector S are used at the same time, that is, the case of low illuminance. In practice, this method will be used most frequently. Accordingly, the built-in flash is easy to handle. It is a matter of course that the auxiliary spotlight projector S can be singly used in the case of low contrast. In this case, a switch may be provided to stop the operation of the flash F in spite of popping-up of the casing 20.

In this invention, the kind and position of the mechanism for popping-up the casing are not limited. For example, the mechanism may be provided at a grip portion, at a film take-up portion or the like in the camera body 10. In this case, the pop-up mechanism may be movable vertically so that She flash F and the auxiliary spotlight projector S can be arranged vertically.

FIGS. 5 and 6 show in a side and a perspective view, respectively, the preferable configuration of an optical system in a focus detecting auxiliary light projecting apparatus, that is, the auxiliary spot projector S shown in FIGS. 1 and 2, according to the present invention. It is intended that the apparatus is applied to a camera equipped with a TTL-type AF system.

In these figures, an imaging lens 51 is included in the camera. In order for the image of an object (not shown) to be formed in focus on a film surface 52, the imaging lens 51 is adapted to be driven from the position indicated by the solid line to the position indicated by either the one-long-and-two-short dashed line or the dashed line in response to the result of focus detection.

The imaging lens 51 also serves as a lens in the focus detecting system such that part of the light emanating from the object passing the lens 51 is reflected by a movable mirror into a focus detecting apparatus which may operate on a variety of principles of focus detecting such as by detection of contrast or by detection of phase difference. The output of the focus detecting apparatus is used by a known lens drive circuit to translate the imaging lens 51 along the imaging optical axis $L_1$–$l_2$ to bring the imaging lens 1 into focus with the object.

Above the imaging lens 51 is disposed, as shown in FIG. 5, a projection optical unit S which makes up a focus detecting auxiliary light projecting apparatus. The optical unit S is an integral assembly of a projection lens 54, a patterned surface 55 and a light source 56. The layout and configurations of the individual components of the optical unit 53 are described below. First, the projection lens 54 is so positioned that its optical axis $l_1$-$l_2$ is inclined to the optical axis $L_1$-$L_2$ of the imaging lens 51, with the two optical axes intersecting each other at a point $C_1$. The patterned surface 55, the light transmitting parts of which diffusely pass the light from the light source 56, is inclined to a plane 54 a which passes through the projection lens 54 and which intersects its optical axis $l_1$-$l_2$ at a right angle. The projection optical unit 53 taken generally forms a tilting optical system. It is generally known that when an object plane is inclined with respect to a plane through a lens that intersects its optical axis, the resulting image plane is spatially inclined with respect to the object plane in accordance with the law of Schib-Lief. Therefore, in the light projecting optical unit S, too, a patterned image plane 55' which is a conjugate surface with respect to the patterned surface 55 will form (i.e., will be focused) in a spatially inclined manner with respect to the patterned surface 55, as shown in FIG. 6.

In the embodiment shown, the imaging lens 51 is so positioned that its optical axis $L_1$-$L_2$ will partially lie in the patterned image plane 55'. Consequently, the extension of the plane 54a which crosses the projection optical axis $l_1$-$l_2$ at a right angle will intersect the extension of the patterned surface 55 at a point $C_o$ which is located on the optical axis $L_1$-$L_2$ of the imaging lens 51.

Light issuing from the light source 56 disposed in the back of the patterned surface 55 passes through the patterned surface and the images of points $P_1$ to $P_4$ on the patterned surface 55 are formed at respective points $P_1'$ to $P_4'$ on the patterned image plane 55', in such a manner that the pattern of alternating clear and opaque lines in the surface 55 will align on the plane 55' in a direction parallel to the imaging optical axis $L_1$-$L_2$. In the embodiment, red light which is in the wavelength region of low luminosity where the human eye is practically insensitive.

In the auxiliary spotlight projector S described above, if the object is situated on the patterned image plane 55', a sharp patterned image of good contrast can always be projected irrespective of the distance to the object.

The patterned image plane 55' can be enlarged by increasing the size of the patterned surface 55 and if its size is increased and a brighter illumination provided by the light source 56, the range of focus detection can be extended to the farthest point that is permissible by the detection capacity of the optical unit 53.

Focus detection, whether it is achieved by the active or passive method, is directed to only part of the imaging range, which is generally referred to as the distance measuring zone. In the embodiment being considered, this distance measuring zone is set to lie in the neighborhood of the optical axis $L_1$-$L_2$ of the imaging lens. Therefore, in the embodiment described above, the optical axis $L_1$-$L_2$ of the imaging lens 51 is situated on the patterned image plane 55' in order to enable precise focus detection and focus adjustment.

The apparatus according to the embodiment described above can be fabricated in a compact size because the single light projecting optical unit S is capable of covering any of the objects that are within the distance metering zone, which if fairly large. As a further advantage, this unit which is an integral combination of the projection lens 54, patterned surface 55 and the light source can be readily assembled into the camera body such as to satisfy the requirements for the layout specified by the present invention.

It is apparent from description of the invention that the auxiliary spotlight projector for radiating a contrast pattern to measure distance is provided adjacent to the flash of the built-in flash provided to the camera body through the pop-up mechanism. Accordingly, it is not necessary that the auxiliary spotlight projector is provided separately from the flash. Further, if the auxiliary spotlight projector for measuring a distance and the flash are to be used at the same time in the case where the subject is too dark enough to attain contrast, the two can be located in the projecting position at the same time. Accordingly, it is easy to handle.

Also a single-lens reflex camera has a subject within a range of from a very near distance to an infinite distance as its aim. An optimum focal-length lens is selected corresponding to the kind of the subject and the distance from the subject. The cylinder length of the interchangeable lens is enlarged corresponding to the focal length thereof. Recently, with the advance of zoom lenses, photographers ordinarily using such zoom lenses to cover from wide-angle lenses to telephoto lenses, instead of conventional fixed-focal-length interchangeable lenses, have increased in number. Generally, the cylinder length of the zoom lens is determined by the maximum focal length. Accordingly, if the zoom lens is shifted to the site of the minimum focal length, the cylinder length is not so shortened.

Therefore, in the case where a built-in flash mechanism is incorporated n a single-lens reflex camera, it becomes important to design the camera to prevent flashlight from being blocked the lens cylinder.

Another object of the invention is to provide a built-in flash which is simple in construction, sure in operation and easy in locating the flash itself in a higher and more advanced light emission position.

On the basis of a conclusion that a turn mechanism by four-point linkage is suited for the mechanism for popping up this type built-in flash, the present invention has been completed. That is, the built-in flash pop-up mechanism according to the present invention is characterized in that the casing is arranged to be moved between the projecting position and the housing position by a pair of four-point linkage mechanisms disposed at the left and right sides of the built-in flash, each of the four-point linkage mechanisms being constituted by two pairs of front and rear turning levers each .pair of the front and rear turning levers being pivoted at their respective one ends to corresponding one of opposite sides of the housing chamber and pivoted at their other ends to front and rear portions on corresponding one of opposite sides of the casing. This mechanism is very simple in construction and therefore is advantageous in that the number of parts is small, the workability in assembling is good, the operation is sure, etc. In addition, the request that the flash must be located in higher and more advanced projecting position can be attained easily.

Figure 7:
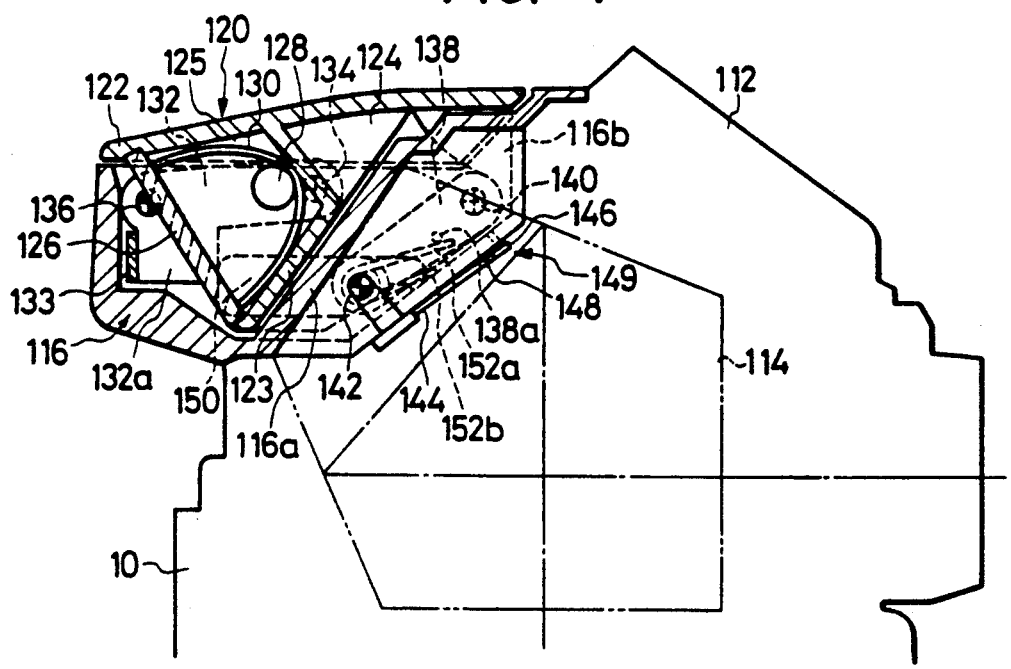
FIG. 7 is a partly vertical section in a housing condition according to a second embodiment
Figure 8:
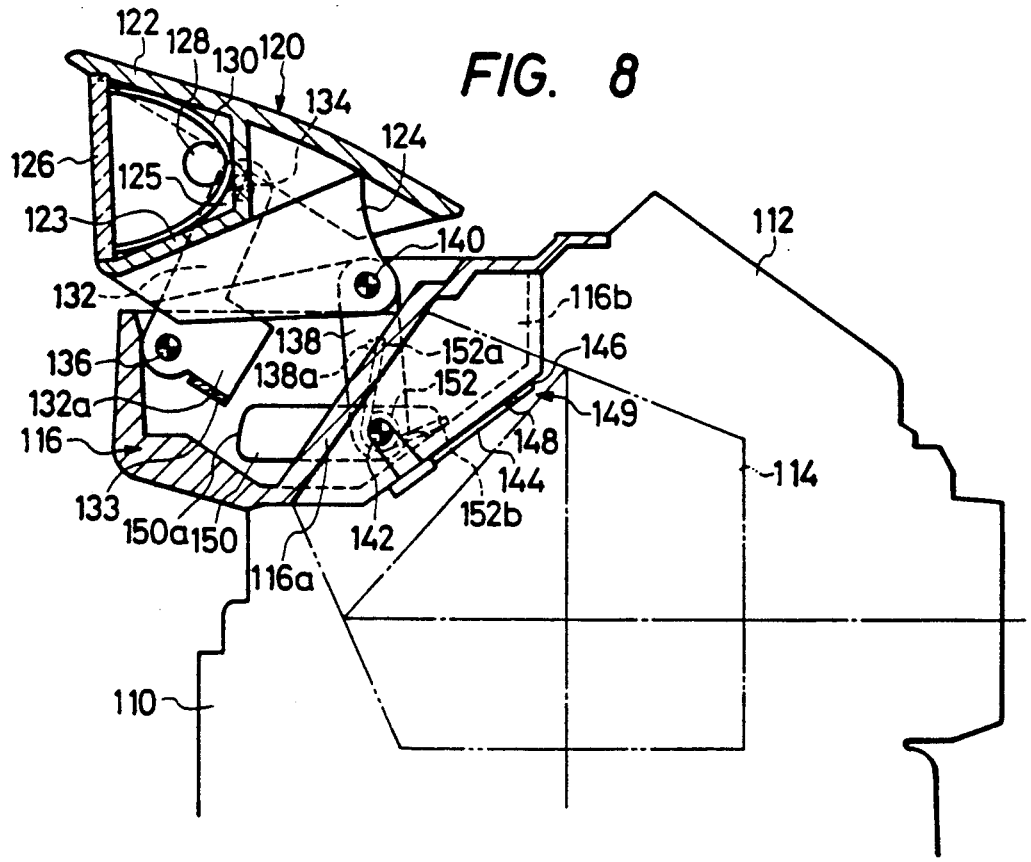
FIG. 8 is a partly vertical section in a projecting condition.
Figure 9:
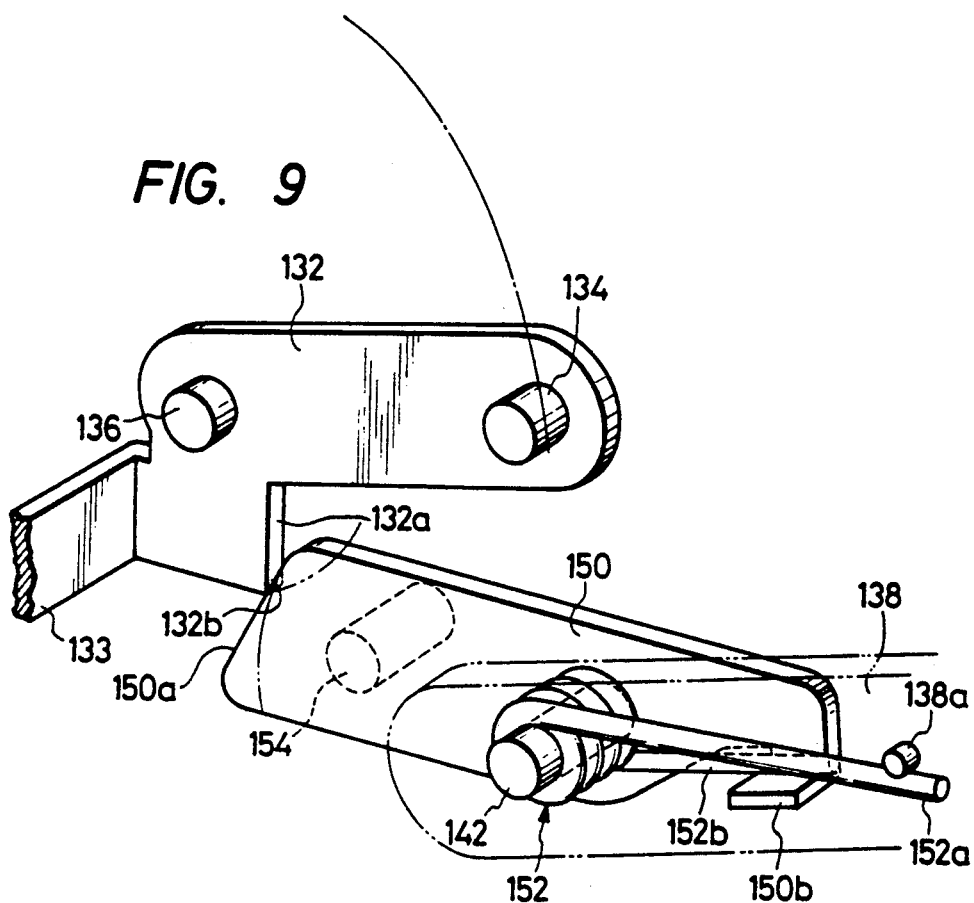
FIGS. 9 and 10 are a perspective view and a sectional view showing an example of a lock mechanism.
Figure 10:
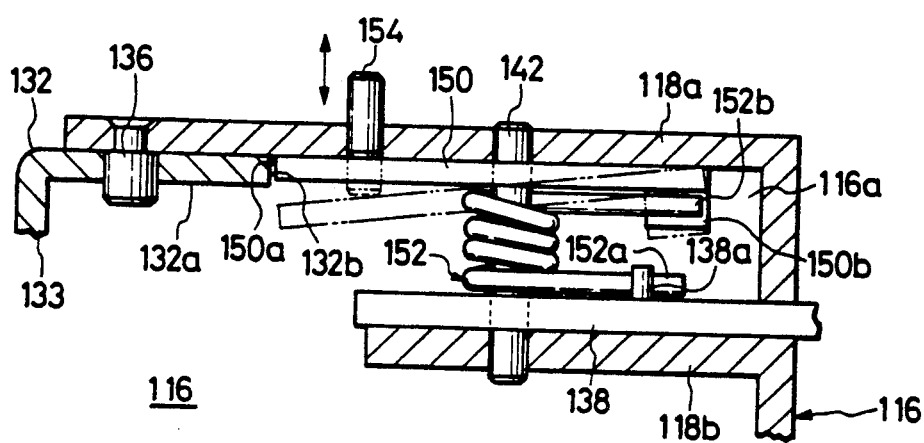
Figure 11:
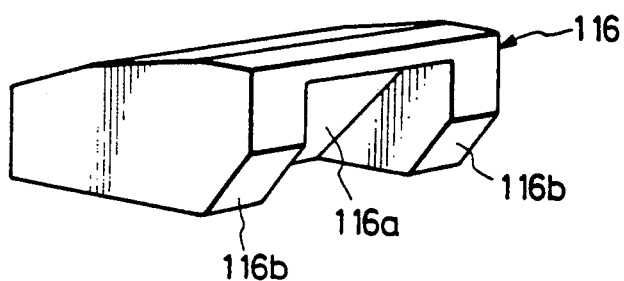
FIG. 11 is a perspective view showing the form of the back of the housing chamber.

A second embodiment of the present invention will be described with reference to FIGS. 7 to 11. FIGS. 7 and 8 show and embodiment of the built-in flash pop-up mechanism according to the present invention, in which FIG. 7 is a partly vertical section in a housing condition and FIG. 8 is a partly vertical section in a projecting condition. FIGS. 9 and 10 show an example of the lock mechanism.

A penta-prism 114 is housed in a penta-house 112 provided at an upper portion of a single-lens reflex camera body 110. A housing chamber 116 for housing a casing 120 of the built-in flash is provided in the upper front of the penta-house 112. The housing chamber 116 has its upper portion opened for entrance of the casing 120. It is apparent from FIG. 11 that a recess 116a for housing the penta-prism 114 is formed in the bottom center of the housing chamber 116. Further, link-housing chambers 116b are formed at the opposite sides of the recess 116a.

The casing 120 has ceiling plate 122 which forms an outside appearance together with the penta-house 112 when the the casing 120 is in the housing position, a bottom plate 123 corresponding to the recess 116a of the housing chamber 116, and side plates 124, one of which is shown, located in the opposite sides of the ceiling plate 122 and the bottom plate 123. A xenon tube (light emitter) 128 and a reflection mirror 130 are housed in a light emission chamber 125 surrounded by the ceiling, bottom and side plates 122, 123 and 124. The reference numeral 126 designates a diffusion plate for covering the front of the light emission chamber 125.

A first turning lever 132 and a second turning lever 138 are pivoted at their respective one ends on the outside surface of each side plate 124 of the casing 120 through shafts 134 and 140, respectively. The shaft 134 is disposed behind the center of the xenon tube 128 and the shaft 140 is disposed at a rear lower portion. Further, the first turning lever 132 is pivoted at its other end on a shaft 136 disposed in an upper front portion of a side wall of the housing chamber 116, and the second turning lever 138 is pivoted at its other end on a shaft 142 disposed in a lower rear portion of the same. The mechanism for popping up the casing 120 is made up of a four-point linkage formed by the first and second turning levers 132 and 138. The pair of first turning levers 132 and the pair of second turning levers 138 are housed in linkage-housing chambers 116b provided on the opposite sides of the housing chamber 116, respectively. The pair of first turning levers 132 are connected by a connection arm 133. The connection arm 133 acts to secure the interlocking operation of the pair of four-point linkage mechanisms. The shaft 142 is disposed on an upper side surface of the penta-prism 114. Each of the first turning levers 132 is L-shaped within each of the linkage-housing chambers 116b, and the shaft 136 is disposed at the bent portion of the first turning lever 132.

When the casing 120 is in the housing position, the first turning levers 132 are made substantially horizontal and the second turning levers 138 are made frontward downward inclined to thereby hold the diffusion lens 126 and hence the casing 120 downward. In the projecting position of the casing 120, the second turning levers 138 are made substantially horizontal and the first turning levers 132 are turned to positions where the first turning levers 132 are substantially vertical to thereby assure the height of the casing when projected.

A torsion spring 152 is interposed in the shaft 142 of the second turning lever 138. One leg portion 152a of the spring 152 is engaged with a projection 138a of the second turning lever 138 so that the second turning lever 138 is urged to move counterclockwise in the drawing or in housing chamber 116.

It is apparent from FIG. 10 that the end portion of the shaft 142 is inserted into a side wall 118a of the housing chamber 116 as well as into a supporting wall 118b at the inside thereof. A lock lever 150 is loosely put on the shaft 142 between the walls 118a and 118b so that the lock lever 150 can move in the axial direction of the shaft 142. The other leg portion 152b of the torsion spring 152 is stop/engaged on a projection 150b of the one end portion of the lock lever 150 so that the lock lever 150 is urged to move clockwise in the drawing normally. The clockwise turning end is limited by contact with the inner wall of the housing chamber 116.

The torsion spring 152 serves also as a compression spring, so that the lock lever 150 is elastically pressed toward the side wall 118a of the housing chamber 116. However, as described above, the lock lever 150 is loosely put on the shaft 142 so that the lock lever can move or turn against the shift-direction force of the spring 152.

The stoppage/engagement surface at the top end of the lock lever 150 is formed as a wedge surface 150a having its lower portion expanded more than the arc (shown by the one-dotted chain line of FIG. 9) with its center at the shaft 142. For example, the wedge surface 150a can be formed of an arc having its center lower than the shaft 152. When the casing 120 is put in the housing chamber 116, the wedge surface 150a frictionally touches a stoppage/engagement surface 132a of the first turning lever 132 to prevent the first turning lever 132 from turning counterclockwise. The wedge surface 150a and the stoppage/engagement surface 132a have the relation that an edge 132b of the stoppage/engagement surface 132a comes into contact with a deeper (lower) point of the wedge surface 150a when the second turning lever is moved downward. Accordingly, the stoppage/engagement prevents the second turning lever 138 from turning counterclockwise due to the force of the torsion spring 152, so that the casing 120 can be kept in the housing position.

The engagement/disengagement between the lock lever 150 and the first turning lever 132 is released by a push button 154 provided through the side wall 118a of the housing chamber 116. The push button 154 is linked to an operation portion (not shown) projected out of the pentahouse 112. When the push button 154 is pushed down, the lock lever 150 is moved inward against the force of the torsion spring 152 by the top end of the push button 154 facing the lock lever 150, so that the wedge surface 150a is disengaged from the stoppage/engagement surface 132a.

A pair of switching members 149, each of which is composed of actuating bar 144 and a contact 148, are provided at the opposite ends of the bottom of the housing chamber 116. The actuating bar has its top end formed as a projection 146 extending into the housing chamber. The switching member 149 serves as a switch of a flashlighting circuit. When the casing 120 is in the housing position, the projection 146 is pressed by the second turning lever 138, so that the actuating bar is disconnected from the contact 148 to open the circuit. On the contrary, when the casing 120 is in the projecting position, the second turning lever 138 is departed from the projection 146, so that the actuating bar is in contact with the contact 148 to close the circuit. In this case, preparation for light emission of the built-in flash starts. The pair of switching members 149 are provided to secure switching operation sufficiently.

In the following, the operation of the pop-up mechanism of the second embodiment will be described.

In the case where the built-in flash is to be used, the operation portion of the push button 154 in the housing condition of FIG. 7 is pushed down. As the result, the lock lever 150 is moved in the axial direction of the shaft 142 so that the wedge surface 150a is disengaged from the stoppage engagement surface 132a. As the result, the second turning lever 138 is moved counterclockwise by the turning force of the torsion spring 152 so that the casing 120 linked to the second and first turning levers 138 and 132 moves upward and forward to the projecting position. In this projecting position, the second lever 138 is separated from the protrusion 146 of the actuating bar 144 and the actuating bar 144 is made to come into contact with the contact 148 to thereby close the switch circuit to start the preparation of the strobe device.

In the case where the built-in flash is to be housed, the ceiling plate 122 of the casing 120 is manually pushed by a finger. As the result, the casing 120 is retracted into the hosing chamber 116 while the first and second turning levers 132 and 138 turn clockwise. A little before the casing 120 reaches the housing position, the edge 132b of the stoppage/engagement surface 132a of the first turning lever 132 touches the wedge surface 150a of the lock lever 150 to start pressing down the lock lever 150. Accordingly, before the casing 120 reaches the housing position, the edge 132b gets over the top portion of the wedge surface 150a to engage with the wedge surface 150a. The frictional contact between the wedge surface 150a and the edge 132b of the stoppage/engagement surface 132a prevents the first turning lever 132 from turning counterclockwise. When the casing is further pressed down, the wedge surface 150a of the lock lever 150 comes into frictional contact with the edge 132b of the stoppage/engagement surface 132a at t deeper point, so that the casing 120 is locked at this position.

Accordingly, any space is never produced between the ceiling plate 122 and the housing chamber 116. Further, in the housing position, the second turning lever 138 pushes the projection 146 of the actuating bar 144 to disconnect the actuating bar 144 from the contact 148 to thereby break the flashlighting circuit.

It is apparent from the above description that the casing of the flash can be moved between the projecting position and the housing position by a dimple linkage mechanism. Accordingly, the pop-up mechanism is advantageous in that the workability in assembling is good, the number of parts is small, and the operation is sure. In addition, it is easy to locate the flash in a higher and more advanced projecting position. Accordingly, even in the case a long focal-length lens or a long focal-length zoom lens having a long cylinder is used, light from the flash is never blocked by the cylinder.

Although the embodiment has shown the case where the lock lever 150 is made to linearly move int he axial direction of the shaft 142, the lock lever 150 may be made to move obliquely or flexuously.

The illustrated invention shows an example of the pop-up mechanism, but is not limited to the specific embodiment; it may be of course applied with equal utility to other pop-up mechanisms as long as the mechanisms are of the type in which the flash is kept in the housing position by a lever turning with the pop-up operation of the flash and by a lock lever engaged with the lever.

In the pop-up device, a lock lever for locking the flash in the housing position is provided with a wedge-action surface by which the flash can be securely kept in the housing position by the wedge action. Accordingly, the flash can be kept in the housing position without idle distance due to a clearance of the stoppage/engagement portion. Consequently, the outside appearance of the camera is never deteriorated.

Figure 12:
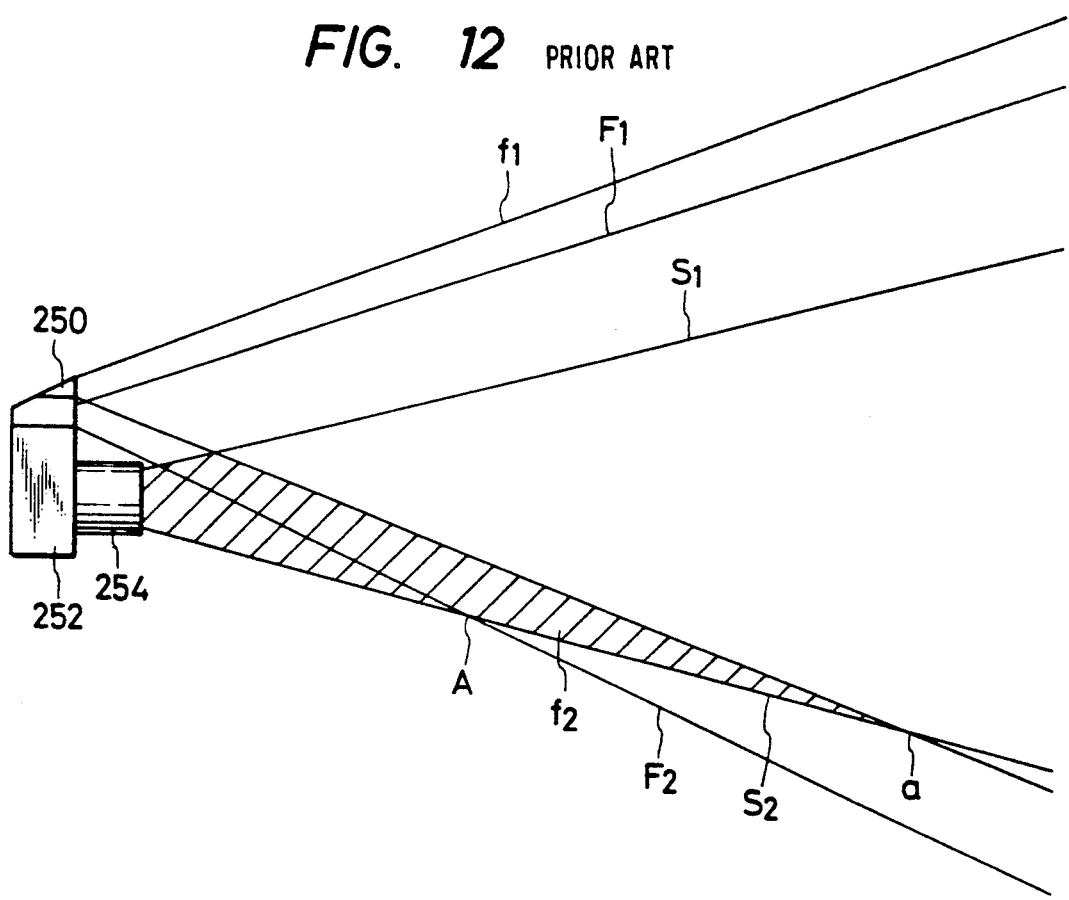
FIG. 12 is a view for explaining the relation between the range of flashlight by the built-in flash and the range of photographing by the camera lens.

The conventional built-in flash has a light emission surface which looks toward an object when the flash unit is in the projecting position. The relation between the radiation angle of the flash and the camera lens is such that as shown in FIG. 12. The range of radiation by the flashlight of the flash unit 250 is within an area between lines f1 and f2. On the other hand, the range of photographing by the camera lens 254 of the camera body 252 is within an area between lines S1 and S2. Accordingly, the flashlight does not reach a hatched area in FIG. 12, that is, the flashlight does not reach a part of the area limited by the camera lens 254. If photographing is carried out when the subject is nearer than the intersection a of lines f2 and S1, the film becomes partly underexposed because the flashlight never reaches the hatched area. This phenomenon causes a problem particularly in macro photographing which has an aim at a close range.

Further, even if the flashlight was designed to reach such a near distance, the film by macro photographing would become overexposed because the quantity of the flashlight can not be reduced from a predetermined value. This phenomenon causes a problem that proper exposure is impossible in macro photographing.

These problems can be solved by widening the radiation angle of the flash. However, when the radiation angle is widened, a new problem arises in that far-distance photographing is limited.

Accordingly a third embodiment of the present invention is directed to an improvement in a built-in flash apparatus of a camera having a flash unit provided in a housing chamber provided at an upper portion of a body of the camera so that the flash unit is movable between a housing position where the flash unit is housed in the housing chamber and a projecting position where the flash unit is projected from the housing chamber, the improvement being characterized in that the flash unit has a light emission surface which is directed forward in normal photographing to look toward a subject when the flash unit is in the projecting position and which is directed more downward in macro photographing to look down to a subject when the flash unit is in the housing position, in that a light-transmissible material is provided in front of the housing chamber, the light-transmissible material being arranged to face the light emission surface when a light emitter is housed in the housing chamber, and in that the flash unit is made to be able to emit light in the housing position as well as in the projecting position.

Further, an ND filter or a diffusion lens may be used as the light-transmissible material to reduce the quantity of light to thereby attain proper exposure.

Figure 13:
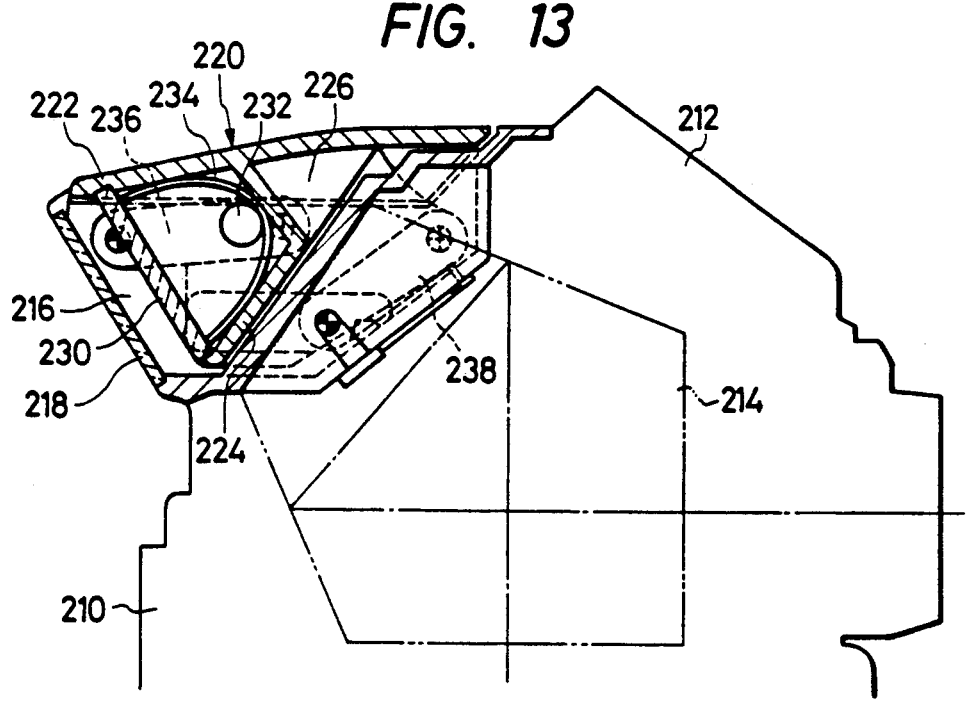
FIGS. 13 and 14 are vertical sections in a housing condition and in a projecting condition respectively showing a camera having a built-in flash as a third embodiment according to the present invention.
Figure 14:
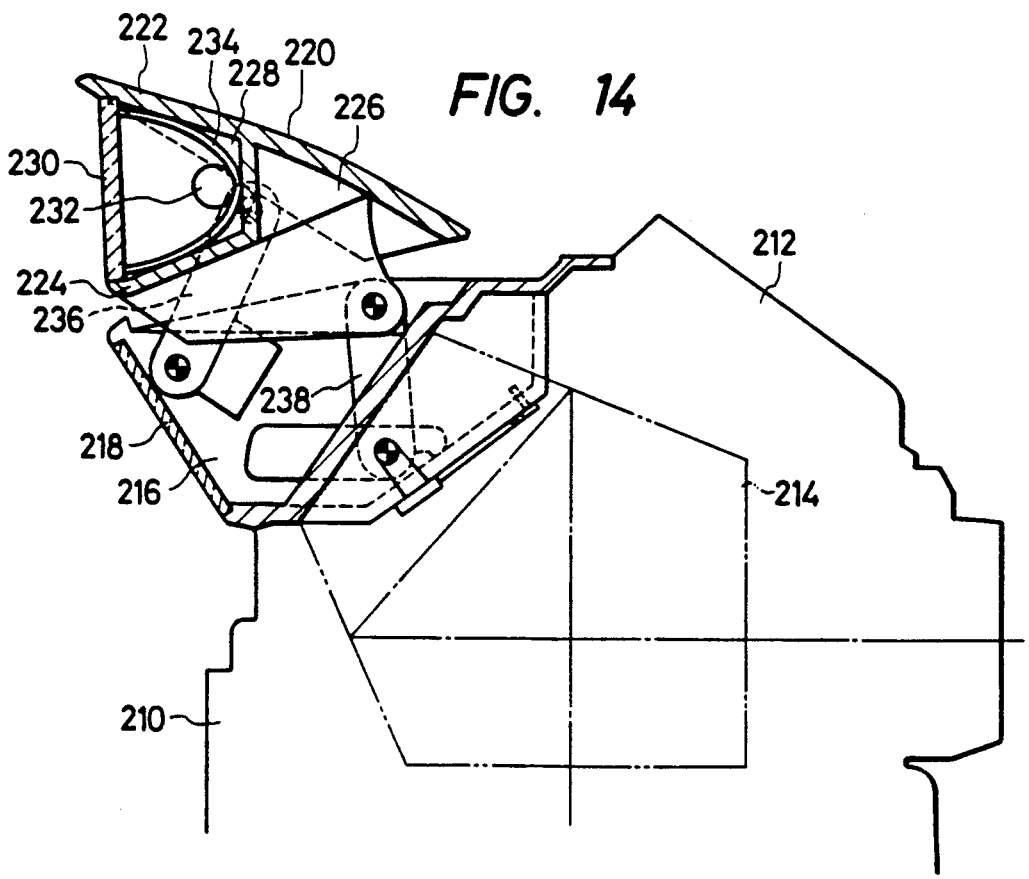
Figure 15:
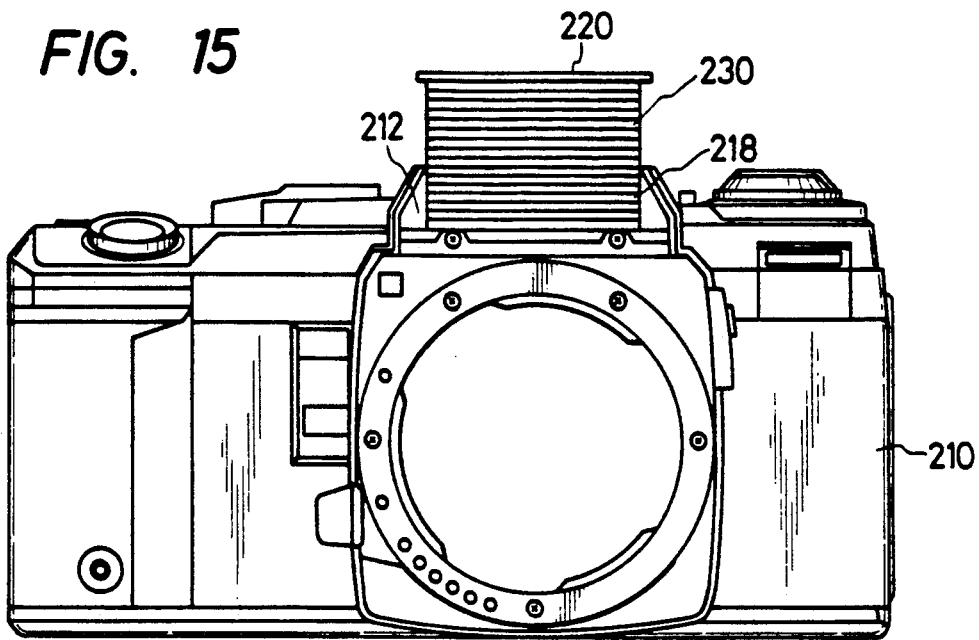
FIG. 15 is a front view showing the outside appearance of the camera.

The third embodiment will be described with reference to FIGS. 13 to 15. FIG. 13 and 14 are partial vertical sections respectively taken along the optical axis, showing a camera having a built-in flash as an embodiment according to the present invention. A penta-prism 214 is housed in a penta-house 212 provided at an upper portion of a single-lens reflex camera body 210. A housing chamber 216 for housing a flash unit 220 of the built-in flash is provided in the upper front of the penta-house 212.

The flash unit 220 is attached to the housing chamber 216 through a known linkage mechanism by which the flash unit 220 can be moved between a housing position (refer to FIG. 13) where the flash unit 220 is housed in the housing chamber 216 and a projecting position (refer to FIG. 14) where the flash unit 220 is projected from the housing chamber 216.

The flash unit 220 has a ceiling plate 222 which forms an outside appearance together with the penta-house when the flash unit 220 is in the housing position, a bottom plate 224 formed along the bottom of the housing chamber 216, and side plates 226 for covering between the ceiling plate 222 and the bottom plate 224. A Fresnel lens (converging lens) 230 acting as a light emission surface is attached to the front of a light emission chamber 228 surrounded by the ceiling, bottom and side plates 222, 224 and 226. A xenon tube 232 and a reflection mirror 234 are housed in the light emission chamber 228. One of important points in the present invention is that the Fresnel lens 230 is arranged to be directed toward the subject in macro photographing when the flash unit 220 is in the housing condition.

A linkage mechanism for popping up the flash unit 220 is provided between the walls of the housing chamber 216 and the side plates 226 at the left and right of the flash unit 220. The structure in the left side is the same as that in the right side, and therefore, the linkage mechanism will be described about one side, hereunder. First and second levers 236 and 238 are pivoted at their respective one ends relative to the side plate 226 through shafts, and are pivoted at their other ends relative to the penta-house 212 through shafts. In short, these levers and shafts constitute a four-point linkage mechanism.

A torsion spring (not shown) is attached to the second lever 238, so that the second lever 238 is urged to move counterclockwise normally, or in other words the flash unit 220 is urged to move upward and forward. Further, a lock member (not shown) for keeping the flash unit 220 in the housing position is provided in the second lever 238 and the penta-house 212.

In addition to the aforementioned construction, a light-transmissible plate 218 is provided in front of the housing chamber 216 so as to face the Fresnel lens 230 in parallel when the flash unit 220 is in the housing position. A transparent glass plate, a diffusion plate, an ND filter, or the like, can be used as the light-transmissible plate 218. The angle of the light-transmissible plate 218 is adjusted so that a normal onto the light-transmissible plate 218 intersects the optical axis of the camera lens system, for example, at a middle point of the photographing-enable distance in macro photographing.

Further, the built-in stroboscopic flash has a switch for permitting light emission when the flash unit 220 is in the housing position. Although the conventional housing-type built-in stroboscopic flash can not make light emission when housed, the flash according to the present invention can make light emission through he switch even when housed.

Therefore, the aforementioned built-in stroboscopic flash operates as follows. In normal photographing, the flash unit 220 is kept in the housing position as shown in FIG. 13 when unused. In use, the flash unit 220 is projected to the usable position as shown in FIG. 14 by releasing the stoppage/engagement of the lock member.

In macro photographing, light emission is made while keeping the flash unit 220 in the housing position. When light emission is made in this condition, light emitted from the xenon tube 232 passes through the Fresnel lens 230 and light-transmissible plate 218 and then reaches the object. The radiation by the flash is within an area between line F1 and F2 of FIG. 15. Accordingly, photographing with flashing can be made even in the case where the subject is far from the intersection A of lines F2 and S2. It is apparent from this fact how near the camera can be approached to the subject by the light emission in the housing condition, compared with the aforementioned fact that the radiation by the flash unit 220 in the projecting position is within an area between lines f1 f2 of FIG. 13.

The invention, as to the mechanism for housing and projecting the flash unit 220, is not limited to the above specific embodiment. For example, the invention is applicable to the case where the rear end of the flash unit 220 is merely pivoted by a shaft.

Although the embodiment has shown the case where the flash unit 220 is projected by the spring force, the flash unit 220 may be moved to the projecting position and to the housing position by an electric motor. For example, this modification can be easily attained by providing a row of gears linked to the electric motor, and a sector gear having its rotational center in the first or second lever 236 or 238 and so as to be engaged with the row of gears.

It is apparent from the above description of the invention that a flash unit having a light emission surface directed toward an object when the flash unit is in the housing condition is provided with a light-transmissible material provided in front of a housing chamber for housing the flash unit so that flashing (light emission) can be made even in the case where the flash unit is housed in the housing chamber. Accordingly, it is possible to light the subject uniformly even in the case of macro photographing. Further, an ND filter or a diffusion lens may be used as the light-transmissible material in the built-in flash to reduce the quantity of light, so that proper exposure in macro photographing can be attained easily.

Figure 16:
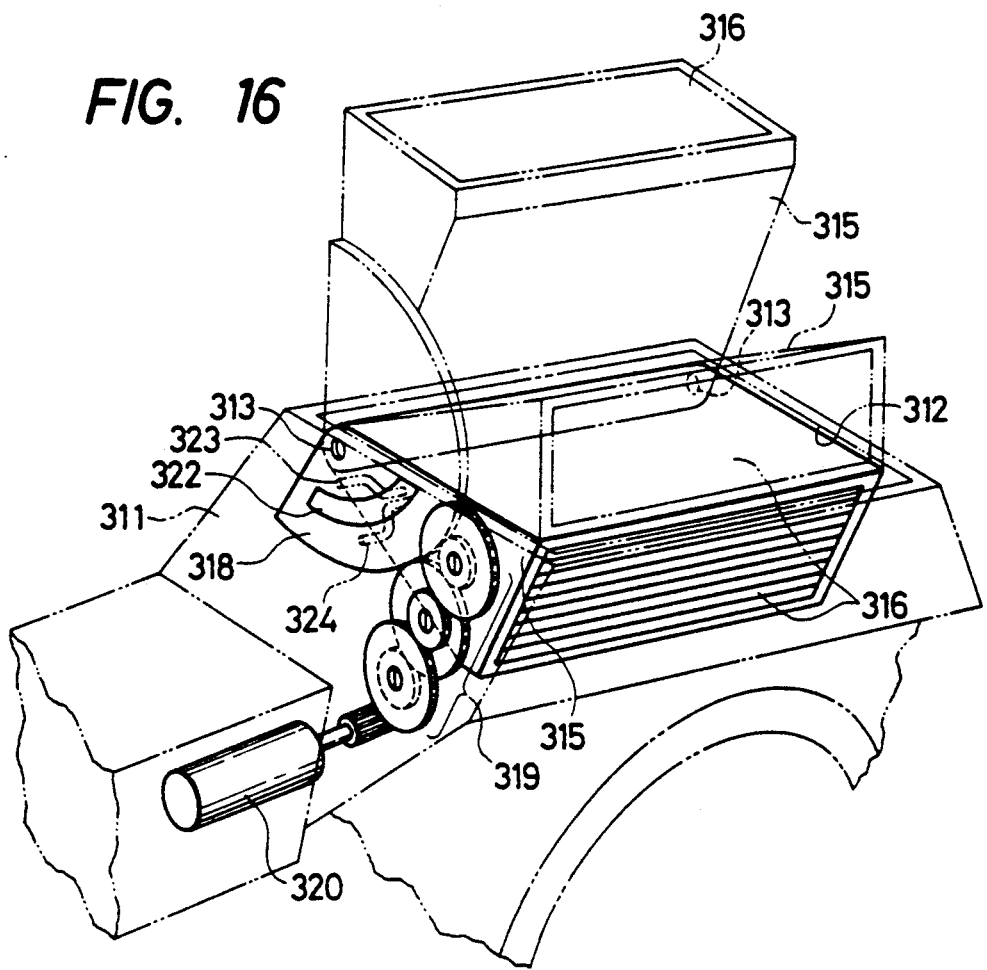
FIGS. 16 and 16a are partly perspective views showing a fourth embodiment of the built-in flash apparatus in a camera according to the present invention.
Figure 16A:
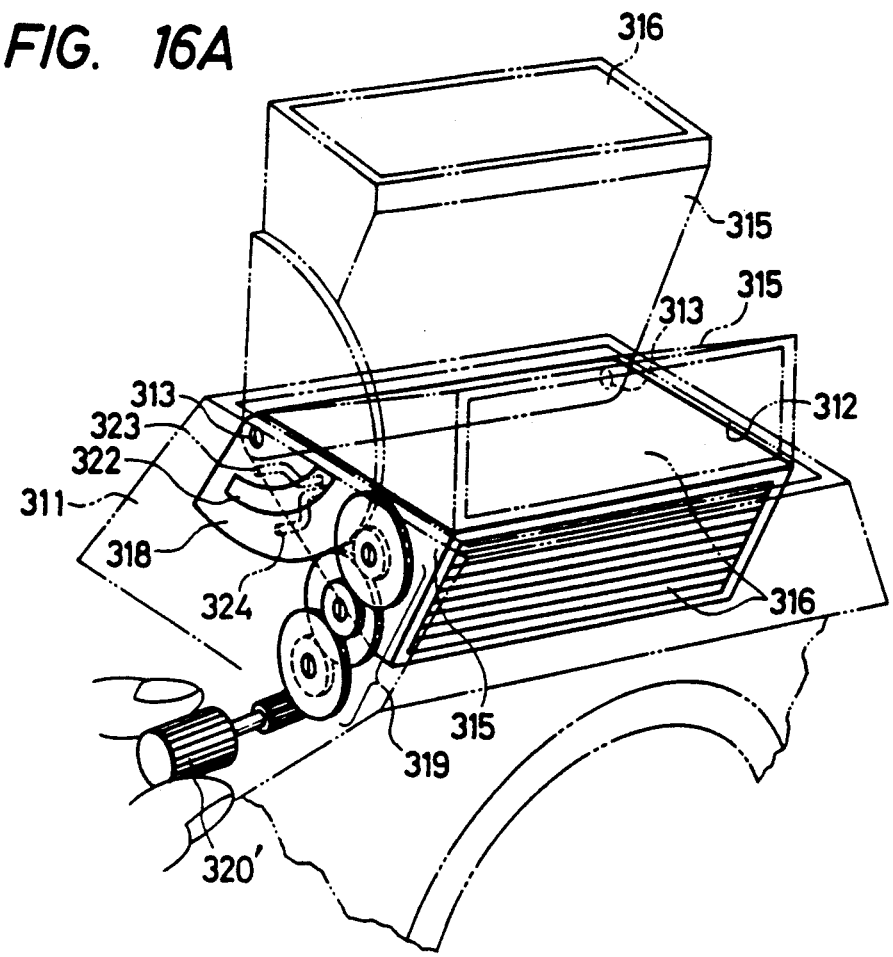

A fourth embodiment of the present invention will be described with reference to FIG. 16. A top plate 311 is provided at the upper portion of a single-lens reflex camera. A flash unit housing chamber 312 is provided on the top plate 311 so as to be located above a penta-prism of the top plate 311. A flash unit 315 is pivoted in the flash unit housing chamber 312 by a pair of shafts 313 disposed at the rear of the housing. The flash unit 315 has a light emission surface (Fresnel lens) 316 as a front surface. Known flash elements which are not shown, such as a light emission tube, a reflector and the like, are provided within the flash unit 315. The flash unit 315 is arranged turnably round the shafts 313, so that the flash unit 315 is movable to the normal light emission position as shown by the two-dotted chain line in the drawing, the bouncing position as shown by the three-dotted chain line, and the housing position as shown by the solid line. The normal light emission position is a position where the light emission surface 316 looks forward to the object. The housing position is a position where the light emission surface 316 looks more downward than the direction toward the object and where the flash unit is housed in the flash unit housing chamber 312. The bouncing position is a position where the light emission surface 316 can move in a range from the normal light emission position to a position where the light emission surface 316 looks upward perfectly. In the drawing, the position where the light emission surface 316 looks upward perfectly is shown for convenience.

A sector gear 318 coaxially provided on the shaft 313 is fixed to a side of the flash unit 315. The sector gear 318 is linked to a drive motor 320 through a row of gears 319. Accordingly, when the drive motor 320 is reversibly operated, the flash unit can turn round the shaft 313 among the aforementioned three positions.

A code plate 322 for detection and control of the position of the flash unit 315 is fixed to a side of the sector gear 318. The code plate 322, in which the pattern is not shown, is in contact with brushes 323 and 324 fixed to the top plate 311, so that not only the housing position and the projecting position can be detected but also multistages of the bouncing position can be detected through the brushes 323 and 324.

When the aforementioned built-in flash is not used, the flash unit 315 is moved to the position as shown by the solid line, by the drive motor 320 to turn the light emission surface 316 more downward than the direction toward the subject so that the flash unit 315 can be housed in the flash unit housing chamber 312. In use, the drive motor 320 is operated to move the flash unit 315 to the position as shown by the two-dotted chain line, so that the flush unit 315 can be projected. For example, a flash-projection signal, that is, a drive signal for the drive motor 320, can be obtained by a flash-up switch not shown or by a release button linked to a device for detecting brightness of the subject. In other words, the flash unit 315 can be automatically projected by pushing the release button by one stage in the case where the subject is dark. A stop signal to the normal light emission position can be obtained by a turn-position-detection signal from the brushes 323 and 324 being in contact with the code plate 322. As described above, having projected at the normal light emission position, the flash unit 315 waits for the completion of charge of the light emission circuit so as to enable photographing with flashing.

After completion of photographing with flashing, for example, the drive motor 320 is reversed by any suitable means, such as re-operation of the flash-up switch, operation of another switch for housing the flash, generation of another switch for housing the flash, generation of a signal for detecting the human hand leaving go his hold of the release button, or the like. As the drive motor 320 is reversed, the flash unit can be housed in the flash unit housing chamber 312. The detection of the housing position and the stoppage of the drive motor 320 can be made in the same manner as described above, through the code plate 322 and brushes 323 and 324.

On the other hand, in the case of bounce-photographing, the drive motor 320 is continuously operated for example through a bounce-light emission switch. As the drive motor 320 is operated, the flash unit 315 moves further upward beyond the normal light emission position where the light emission surface 316 looks toward the subject. Accordingly, if the photographer releases the bounce-light emission switch when the angle of the light emission surface 316 becomes suitable, any suitable angle can be selected. As the simplest method, it is possible to move the light emission surface 316 automatically to the position of the three-dotted chain line where the light emission surface 316 looks most upward when the bounce-light emission switch is turned on.

As another operating method at bounce-photographing, a bounce-angle changeover dial may be provided to set the angle of the flash unit 315 so that the flash unit 315 can be turned by an angle set by the dial. Such control can be easily attained by the bounce-angle changeover dial linked to the code plate 322, the brushes 323 and 324, and the drive motor 320.

After completion of the bounce-photographing, the flash unit 315 can be moved to the housing position in the same manner as described above, by the drive motor 320 through re-operation of the bounce-light emission switch, operation of another flash-housing switch or the like.

Although the embodiment has shown the case where the flash unit 315 turns round the shafts 313 to any one of the housing position, the normal light emission position and the bouncing position, linking means, such as four-bar linkage and the like, may be used as a mechanism for moving the flash unit 315. Any suitable means can be selected, if the flush unit 315 can be supported to turn the light emission surface 316 forward (normal light emission position), downward (housing position) and upward (bouncing position) with respect to the subject and the flash unit 315 can be moved by the electric motor.

As described above, according to the this embodiment the flash unit can be moved between the housing position and the projecting position by the electric motor, so that any shock due to the movement of the flash unit between the projecting position and the housing position can be avoided to thereby attain a desirable operational feeling. Further, the light emission surface of the flash unit can be moved more upward than the direction toward the subject to make bounce-photographing possible without requiring any other outside flash. Accordingly, the capability of a single camera in photographic expression can be widened.

Figure 17:
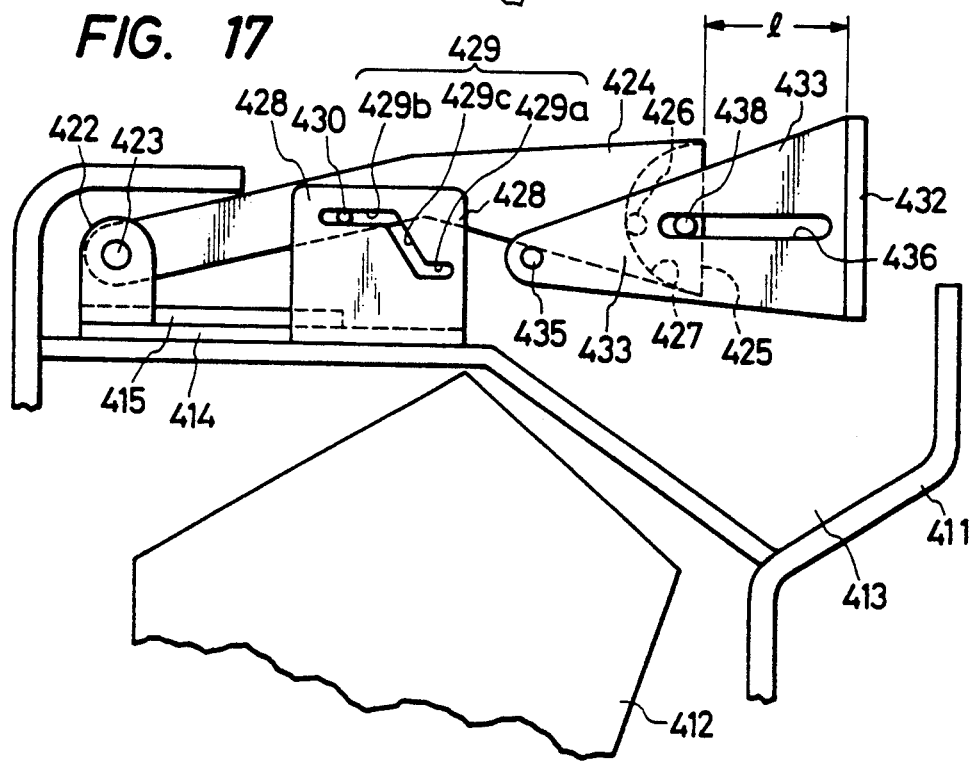
FIGS. 17 and 18 are sectional views of the flash unit, in the normal light emission position and in the housing position, respectively, according to fifth embodiment.
Figure 18:
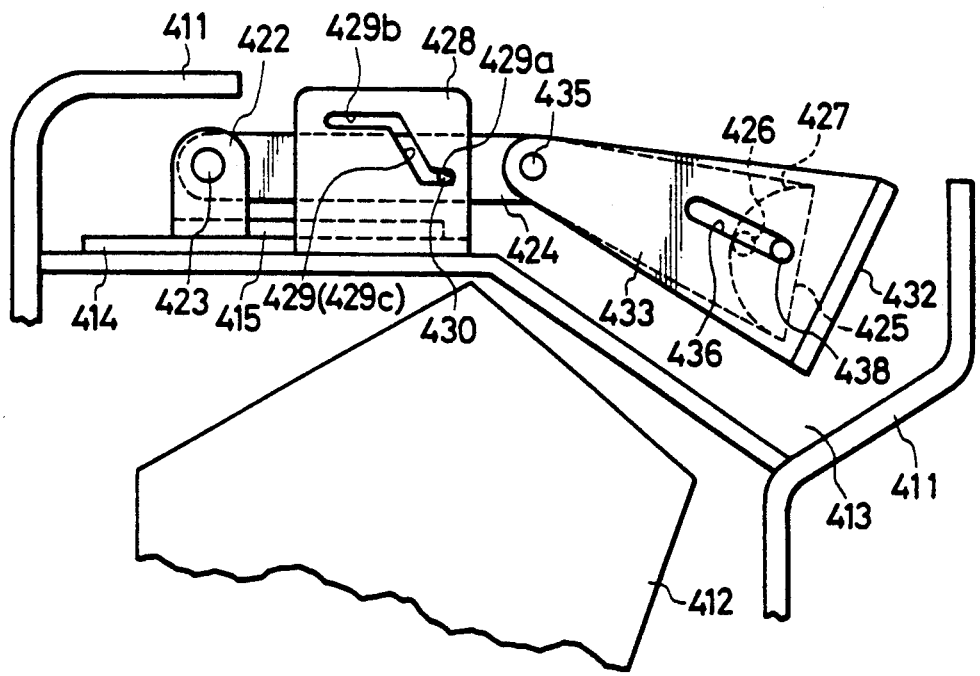
Figure 19:
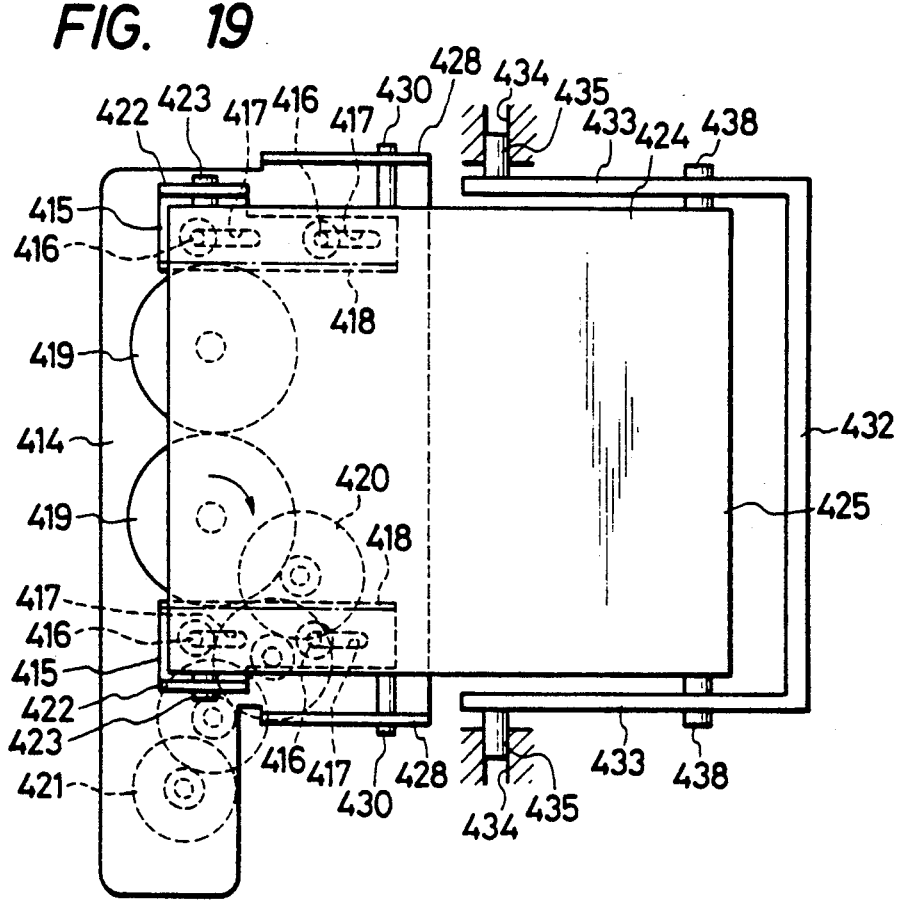
FIG. 19 is a partly plan view of the built-in flash apparatus.

A fifth embodiment of the present invention will be described with reference to FIGS. 17 to 19. A top plate 411 is provided at the upper portion of a single-lens reflex camera. A flask unit housing chamber 413 is provided on the top plate 411 so as to be located above a pentaprism 412. Within the flash unit housing chamber 413, a ground plate 414 is horizontally fixed to the rear portion of the flash unit housing chamber 413. A pair of slide plates 415 are provided at opposite sides of the ground plate 44 so as to be longitudinally slidable. A guide mechanism for the slide plates 415 is composed of guide pins 416 respectively fixed onto opposite ends of the ground plate 414 so as to be different from each other in position, and slots 416 respectively provided in the slide plates 415 to be fitted to the guide pins 416.

The pair of slide plates 415 are provided with racks 418 facing each other. A pair of gears 419 having the same number of teeth and rotatably supported on the ground plate 414 are respectively engaged with the racks 418. The gears 419 are engaged with each other. One of the gears 419 is rotated by an electric motor 421 through a reduction gear row 420. Accordingly, the pair of slide plates 415 move forward or backward in the same direction when the electric motor 421 rotates forward or backward.

The pair of slide plates 415 are respectively provided with upward-bent edges 422 between which a flash unit 424 is turnably supported by a shaft 423. The flash unit 424, which has no converging lens body, has a light emission surface 425 at its front portion and known flash elements, such as a light emission tube 426, a reflector 427 and the like, housed int he flash unit 424.

A pair of cam plates 428 formed by bending upward are disposed on opposite sides of the ground plate 414. The cam plates 428 are respectively provided with cam grooves 429 for controlling the attitude of the flash unit 424. The cam grooves 429 are provided for insertion of a pair of pins 430 projecting from sides of the flash unit 424 and, more particularly, each cam groove 429 is composed of a housing cam portion 429a, a projecting cam portion 429b and an inclined cam portion 429c, the former two portions 429a and 429b being horizontal, the latter portion 429c being connecting the former two portions. When the pins 430 are put into the corresponding housing cam portions 429a, the flash unit 424 is housed in the flash unit housing chamber 413 with the light emission surface 425 being turned downward. When the pins 430 are put into the corresponding projecting cam portions 429b, the light emission surface 425 is turned round the shaft 423 so that the flash unit 424 projects from the flash unit housing chamber 413 so as to face an object.

An Fresnel lens plate (converging lens body) 432 to be disposed on the front of the light emission surface 425 of the flash unit 424, has swing arms 433 extending backward from the opposite sides thereof. Bearing pins 435 are provided at the rear end portions of the swing arms 433 so that the pivot pins 435 are rotatably supported into pivot holes 434 at the side walls of the flash unit housing chamber 413.

The swing arms 433 of the Fresnel lens plate 432 are provided with interlock slots 436 into which interlock pins 438 projecting from the opposite sides of the flash unit 424 are inserted. The interlock slots 436 and the interlock pins 438 are arranged so as to locate the Fresnel lens plate 432 in front of the light emission surface 425 in parallel with the former when the flash unit 424 is in the housing position, while so as to interlockingly locate the Fresnel lens plate 432 in front of the light emission surface 25 in parallel with the former when the flash unit turns to the projecting position (normal light emission position).

The aforementioned built-in flash according to this embodiment operates as follows. Assume now that the flash is in the housing position as shown in FIGS. 18 and 19. One of the gears 419 directly linked to the electric motor 421 is rotated in the direction of the arrow by the electric motor 421, so that the other gear 419 rotates in the reverse direction. The pair of slide plates 415 move backward according to the engagement between the gears 419 and the racks 418. The flash unit 424 which is rotatably supported by the shaft 423 at the upward-bent edges 422 of the slide plates 415, also moves backward. The pins 430 of the flash unit 424 change their positions from the housing cam portions 429a to the inclined cam portions 429c of the cam grooves 429, so that the flash unit 424 moves round the shaft 423 to turn the light emission surface 425 upward. Finally, the pins 430 are put into the projecting cam portions 429b, so that the light emission surface 425 looks toward a subject correctly.

When the flash unit 424 moves upward, the interlock pins 438 implanted in the sides thereof also move upward. Accordingly, the Fresnel lens plate 432 locked by the interlock pins 438 and the interlock slots 436 also moves round the pivot pins 435 upward to the front of the light emission surface 425. Thus, preparation for flash-lighting has been completed.

When the slide plates 415 are further moved backward from this condition, the pins 430 of the flash unit 424 move within the projecting cam portions 429b and the interlock pins 438 move within the interlock slots 436. Accordingly, the distance l between the light emission surface 425 and the Fresnel lens plate 432 changes. As the distance l changes, the radiation angle of the flashlight radiated from the Fresnel lens plate 432 changes. That is, as the light emission surface 425 becomes more distant from the Fresnel lens plate 432, the flash radiation angle becomes more narrow suitable to a telephotographic lens. On the contrary, when the light emission surface 425 approaches to the Fresnel lens plate 432, a radiation angle suitable to a wide-angle photographic lens can be attained.

When the electric motor 421 is reversed, the slide plates 415 move forward. Accordingly, the flash unit 424 and Fresnel lens plate 432 move downward in the reverse course to the aforementioned operation, so that the flash unit 424 returns to housing position as shown in FIG. 18.

For example, a flash exclusive switch may be provided for the switching and rotational control of the electric motor 421 to move the flash unit 424 from the housing position to the projecting position. Alternatively, a device for detecting the brightness of the subject and a release button may be provided to be linked to each other so that the flash unit 424 can be projected when the release button is half-pushed under the condition in which the brightness takes a value not more than a predetermined value. For example, the distance l between the light emission surface 425 and the Fresnel lens plate 432 in the normal light emission position may be established by manual operation of a focal length establishing member or may be established by automatic operation in which the position of the slide plates is controlled by the electric motor 421 according to focal-length information as long as the focal-length information can be obtained electrically or mechanically.

As described above, according to the present invention, the radiation angle of the built-in flash can be changed. Accordingly, it is made possible to adjust the radiation angle in accordance with the focal length of the camera lens. Further, the flash unit can be moved by the electric motor, so that any shock due to the movement of the flash unit between the projecting position and the housing position can be avoided to thereby attain a desirable operational feeling.

We claim:

1. In a built-in flash pop-up device in which a flash is provided in a housing chamber provided above a pentaprism in a body of a camera so as to be movable between a housing position and a projecting position by turning operation of a turning lever:

a lock mechanism for locking said built-in flash pop-up device characterized in that a lock lever, having an engagement surface arranged to engage a stoppage surface of said turning lever when said flash is moved to said flash-housing position, is pivotally mounted to said housing chamber, and in that said lock lever is arranged to be moved in the axial direction of a shaft of said turning lever so as to disengage said engagement surface of said lock lever from said stoppage surface of said turning lever.

2. The built-in flash pop-up device according to claim 1, wherein said engagement surface of said lock lever is formed as a wedge surface having a wedge function when said turning lever is moved toward said flash-housing position.

3. In a built-in flash pop-up device in which a flash is provided in a housing chamber provided in a body of a camera so as to be movable between a housing position and a projecting position by turning operation of a turning lever pivotable about an axis, a lock mechanism for locking said built-in flash pop-up device, said lock mechanism comprising:

a lock lever having an engagement surface arranged to engage said turning lever when said flash is moved to said housing position, and means for moving said lock lever in a release direction substantially parallel to said axis so as to disengage said engagement surface of said lock lever from said turning lever.

4. A device according to claim 3, wherein said lock lever is biased in a direction opposite said release direction.

5. A device according to claim 3, wherein said lock lever is biased for pivoting in a first direction about a second axis and is pivoted about said second axis in a second direction by said turning lever as said flash is moved from said projecting position to said housing position.

6. A pop-up device for a built-in flash provided in a housing chamber provided in a body of a camera so as to be movable between a housing position and a projecting position, said device including:

a turning lever having a first surface and being pivotable in a first direction about an axis as said flash is moved from said projecting position to said housing position and pivotable in a second direction about said axis as said flash is moved from said housing position to said projecting position; and a lock lever arranged to engage said turning lever when said flash is moved to said housing position, said lock lever having an inclined engagement surface for engaging said first surface of said turning lever at a plurality of positions of said flash; and biasing means for biasing said lock lever for movement of said inclined surface toward said first surface.

* * * * *

UNITED STATES PATENT AND TRADEMARK OFFICE
CERTIFICATE OF CORRECTION

PATENT NO.    : 5,329,327
DATED         : July 12, 1994
INVENTOR(S)   : Akihiro Arai It is certified that error(s) appears in the above-identified patent and that said Letters Patent is hereby corrected as shown below:

Cover Sheet, [75] Inventors: delete second inventor "Tetsuji Shono"

Signed and Sealed this

Seventeenth Day of December, 1996

Attest:

BRUCE LEHMAN

*Attesting Officer*    *Commissioner of Patents and Trademarks*